US012610443B2

(12) United States Patent
Squillace

(10) Patent No.: US 12,610,443 B2
(45) Date of Patent: Apr. 21, 2026

(54) DETERMINING SPATIAL OFFSET AND DIRECTION FOR PIXELATED LIGHTING DEVICE BASED ON RELATIVE POSITION

(71) Applicant: SIGNIFY HOLDING B.V., Eindhoven (NL)

(72) Inventor: Jorge Gabriel Squillace, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 12 days.

(21) Appl. No.: 18/696,422

(22) PCT Filed: Sep. 19, 2022

(86) PCT No.: PCT/EP2022/075886
§ 371 (c)(1),
(2) Date: Mar. 28, 2024

(87) PCT Pub. No.: WO2023/052160
PCT Pub. Date: Apr. 6, 2023

(65) Prior Publication Data

US 2024/0381512 A1 Nov. 14, 2024

(30) Foreign Application Priority Data

Sep. 28, 2021 (EP) .................................... 21199335

(51) Int. Cl.
*H05B 47/155* (2020.01)
*H05B 45/20* (2020.01)
(Continued)

(52) U.S. Cl.
CPC ........... *H05B 47/155* (2020.01); *H05B 45/20* (2020.01); *H05B 47/11* (2020.01); *H05B 47/165* (2020.01)

(58) Field of Classification Search
CPC .... H05B 47/155; H05B 47/11; H05B 47/165; H05B 47/105; H05B 45/20
See application file for complete search history.

(56) References Cited

U.S. PATENT DOCUMENTS 9,820,364 B2 * 11/2017 Van Der Brug ..... H05B 47/199
9,826,603 B2 * 11/2017 Thorn ................. H05B 47/105
(Continued)

FOREIGN PATENT DOCUMENTS

WO 2018224390 A1 12/2018
WO 2020089150 A1 5/2020

*Primary Examiner* — Raymond R Chai

(57) ABSTRACT

A system (1) is configured to control first and second pixelated lighting devices (10,20) based on a dynamic light scene. The dynamic light scene comprises light settings that move across individually controllable light segments (12-18,22-27) of the pixelated lighting devices over time. An initial mapping has been determined from the dynamic light scene to the light segments of the first lighting device. The system is 5configured to obtain a position of the first lighting device relative to the second lighting device, determine a spatial offset for the initial mapping based on this position, determine a spatial direction of the dynamic light scene relative to the first lighting device based on this position, and control the first lighting device to render the dynamic light scene according to an adjusted initial mapping. The initial mapping is adjusted by offsetting the initial mapping 10according to the spatial offset and the spatial direction.

13 Claims, 6 Drawing Sheets

(51) Int. Cl.

| | |
|---|---|
| ***H05B 47/11*** | (2020.01) |
| ***H05B 47/165*** | (2020.01) |

(56) References Cited

U.S. PATENT DOCUMENTS

| | | | | |
|---|---|---|---|---|
| 2017/0245352 | A1* | 8/2017 | Van Der Brug ....... | H05B 45/10 |
| 2018/0249554 | A1 | 8/2018 | Aliakseyeu et al. | |
| 2018/0352635 | A1 | 12/2018 | Meerbeek et al. | |
| 2018/0368230 | A1* | 12/2018 | Chen ...................... | H05B 45/20 |
| 2019/0335560 | A1 | 10/2019 | Kurvers et al. | |
| 2019/0361259 | A1 | 11/2019 | Sapienza et al. | |
| 2024/0090104 | A1* | 3/2024 | Squillace ............. | H05B 47/155 |

* cited by examiner

DETERMINING SPATIAL OFFSET AND DIRECTION FOR PIXELATED LIGHTING DEVICE BASED ON RELATIVE POSITION

CROSS-REFERENCE TO PRIOR APPLICATIONS

This application is the U.S. National Phase application under 35 U.S.C. § 371 of International Application No. PCT/EP2022/075886, filed on Sep. 19, 2022, which claims the benefit of European Patent Application No. 21199335.7, filed on Sep. 28, 2021. These applications are hereby incorporated by reference herein.

FIELD OF THE INVENTION

The invention relates to a system for controlling a first pixelated lighting device and at least a second pixelated lighting device based on a dynamic light scene, each of the pixelated lighting devices comprising a plurality of individually controllable light segments, wherein an initial mapping has been determined from the dynamic light scene to the plurality of individually controllable light segments of the first pixelated lighting device.

The invention further relates to a method of controlling a first pixelated lighting device and at least a second pixelated lighting device based on a dynamic light scene, each of the pixelated lighting devices comprising a plurality of individually controllable light segments, wherein an initial mapping has been determined from the dynamic light scene to the plurality of individually controllable light segments of the first pixelated lighting device.

The invention also relates to a computer program product enabling a computer system to perform such a method.

BACKGROUND OF THE INVENTION

The introduction of LED lighting and the introduction of connected lighting have made it possible to create more sophisticated light experiences. Sometimes, it is even possible for users to create complex light scenes themselves, e.g., dynamic light scenes and/or light scenes for pixelated lighting devices.

However, when lighting devices are arranged in a particular way in a room, some light scenes that look well when they are defined could potentially start looking worse when the positions and/or orientations of the lighting devices are changed. Although it is possible to have a system automatically select a light scene based on the positions of the lighting devices, as has been disclosed in US 2018/0352635 A1, a user may still want to be able to use a certain light scene after he has changed positions and/or orientations of lighting devices. He would then need to modify this light scene to work well in the new arrangement of the lighting devices, which is especially cumbersome if the light scenes are dynamic light scenes for pixelated lighting devices.

US 2019/335560 A1 discloses a lighting device comprises an array of controllable light emitting pixels, each pixel having an adjustable light output colour. A controller is configured to receive a limited set of light output colours and to locally process these light output colours to form a colour gradient pattern to be displayed across pixels of the array.

SUMMARY OF THE INVENTION

It is a first object of the invention to provide a system, which is able to control pixelated lighting devices to render a dynamic light scene in a manner optimized for a current arrangement of the pixelated lighting devices.

It is a second object of the invention to provide a method which can be used to control pixelated lighting devices to render a dynamic light scene in a manner optimized for a current arrangement of the pixelated lighting devices.

In a first aspect of the invention, a system for controlling a first pixelated lighting device and a second pixelated lighting device based on a dynamic light scene, each of the first and second pixelated lighting devices comprising a plurality of individually controllable light segments, wherein an initial mapping has been determined from the dynamic light scene to the plurality of individually controllable light segments of the first pixelated lighting device, comprises at least one input interface, at least one transmitter, and at least one processor configured to control, via the at least one transmitter, the first pixelated lighting device and the second pixelated lighting device based on the dynamic light scene, the dynamic light scene comprising a plurality of light settings that move across the plurality of individually controllable light segments over time.

The at least one processor is further configured to obtain, via the at least one input interface, a position of the first pixelated lighting device relative to the second pixelated lighting device, determine a spatial offset for the initial mapping based on the position of the first pixelated lighting device relative to second pixelated lighting device, determine a spatial direction of the dynamic light scene relative to the first pixelated lighting device based on the position of the first pixelated lighting device relative to the second pixelated lighting device, and control, via the at least one transmitter, the first pixelated lighting device to render the dynamic light scene according to an adjusted initial mapping, the initial mapping being adjusted by offsetting the initial mapping according to the spatial offset and the spatial direction.

By determining the spatial offset and spatial direction for the first pixelated lighting device based on the position of the first pixelated lighting device relative to the second pixelated lighting device, a dynamic light scene recalled by a user may be rendered in a manner optimized for the current position of the first pixelated lighting device relative to the second pixelated lighting device without the user having to modify the parameters of his recall action to reflect any change in this position. The at least one processor may be configured to determine the initial mapping or to control the first pixelated lighting device to determine this initial mapping, for example.

The dynamic light scene may be a gradient light effect that moves across the pixelated lighting devices over time. The spatial offset may be a shift of the mapping of the light settings onto the plurality of individually controllable light segments across the pixelated lighting device. The spatial direction may be a direction in which the dynamic light scene moves across the pixelated lighting device.

In a similar manner as described above, the position of the first pixelated lighting device relative to one or more further pixelated lighting devices may also be taken into account. In a similar manner as described above, an initial mapping for the second pixelated lighting device and/or one or more further pixelated lighting devices may also be adjusted.

The at least one processor may be configured to determine a transition speed and control the first pixelated lighting device to render the dynamic light scene according to a plurality of successive mappings, a usage duration of each of the successive mappings depending on the transition speed and the plurality of successive mappings including the adjusted initial mapping. The transition speed may be defined, for example, as the distance (e.g., the number of light segments) the light settings travel per time unit.

The at least one processor may be configured to determine an angle between the first and second pixelated lighting devices based on the position of the first pixelated lighting device relative to the second pixelated lighting device and determine the transition speed based on the angle. Alternatively or additionally, the at least one processor may be configured to determine a length of the first pixelated lighting device and determine the transition speed based on the length.

The at least one processor may be configured to determine a color and/or light intensity range within the dynamic light scene and the initial mapping is further adjusted to conform to the color and/or light intensity range. This may be used to ensure that light segments (of different pixelated lighting devices) which have a similar horizontal position render a similar light setting or that light segments (of different pixelated lighting devices) which have as similar vertical position render a similar light setting.

The at least one processor may be configured to determine an angle between the first and second pixelated lighting devices based on the position of the first pixelated lighting device relative to the second pixelated lighting device and determine the color and/or light intensity range based on the angle. Additionally or alternatively, the at least one processor may be configured to determine a length of the first pixelated lighting device and determine the range based on the length. For example, a shorter pixelated lighting device may render less colors of a color palette at a time than a longer pixelated lighting device.

The at least one processor may be further configured to determine the spatial direction of the dynamic light scene relative to the first pixelated lighting device further based on a spatial direction of the dynamic light scene relative to the second pixelated lighting device as used by the second pixelated lighting device. This may be beneficial if the spatial direction is not the same for each pixelated lighting device, e.g., user configurable.

The position of the first pixelated lighting device relative to the second pixelated lighting device may be indicative of a relative distance between the first and second pixelated lighting devices, and the at least one processor may be configured to determine whether the relative distance between the first and second pixelated lighting devices exceeds a threshold, and determine the spatial offset and the spatial direction based on the position of the first pixelated lighting device relative to second pixelated lighting device if it is determined that the relative distance between the first and second pixelated lighting devices does not exceed the threshold. For example, it may be desirable to use default behavior when two pixelated lighting devices are not close to each other. The at least one processor may be configured to allow a user to adjust the threshold.

The at least one processor may be configured to select a light segment from the plurality of individually controllable light segments of the first pixelated lighting device, the light segment being closest to the second pixelated lighting device, and determine the spatial offset based on the selected light segment.

Successive mappings from the dynamic light scene to the pluralities of individually controllable light segments may be determined based on the initial mapping, the spatial offset, and the spatial direction. The at least one processor may be configured to determine these successive mappings or to control the pixelated lighting device to determine these successive mappings, for example.

In a second aspect of the invention, a method of controlling a first pixelated lighting device and a second pixelated lighting device based on a dynamic light scene, each of the first and second pixelated lighting devices comprising a plurality of individually controllable light segments, wherein an initial mapping has been determined from the dynamic light scene to the plurality of individually controllable light segments of the first pixelated lighting device, comprises obtaining a position of the first pixelated lighting device relative to the second pixelated lighting device and determining a spatial offset for the initial mapping based on the position of the first pixelated lighting device relative to second pixelated lighting device.

The method further comprises determining a spatial direction of the dynamic light scene relative to the first pixelated lighting device based on the position of the first pixelated lighting device relative to the second pixelated lighting device and controlling the first pixelated lighting device and the second pixelated lighting device based on the dynamic light scene, the dynamic light scene comprising a plurality of light settings that move across the plurality of individually controllable light segments over time and the first pixelated lighting device being controlled to render the dynamic light scene according to an adjusted initial mapping, the initial mapping being adjusted by offsetting the initial mapping according to the spatial offset and the spatial direction. The method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling a first pixelated lighting device and a second pixelated lighting device based on a dynamic light scene, each of the first and second pixelated lighting devices comprising a plurality of individually controllable light segments, wherein an initial mapping has been determined from the dynamic light scene to the plurality of individually controllable light segments of the first pixelated lighting device.

The executable operations comprise obtaining a position of the first pixelated lighting device relative to the second pixelated lighting device, determining a spatial offset for the initial mapping based on the position of the first pixelated lighting device relative to second pixelated lighting device, determining a spatial direction of the dynamic light scene relative to the first pixelated lighting device based on the position of the first pixelated lighting device relative to the second pixelated lighting device and controlling the first pixelated lighting device and the second pixelated lighting device based on the dynamic light scene, the dynamic light scene comprising a plurality of light settings that move across the plurality of individually controllable light segments over time and the first pixelated lighting device being controlled to render the dynamic light scene according to an adjusted initial mapping, the initial mapping being adjusted by offsetting the initial mapping according to the spatial offset and the spatial direction.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
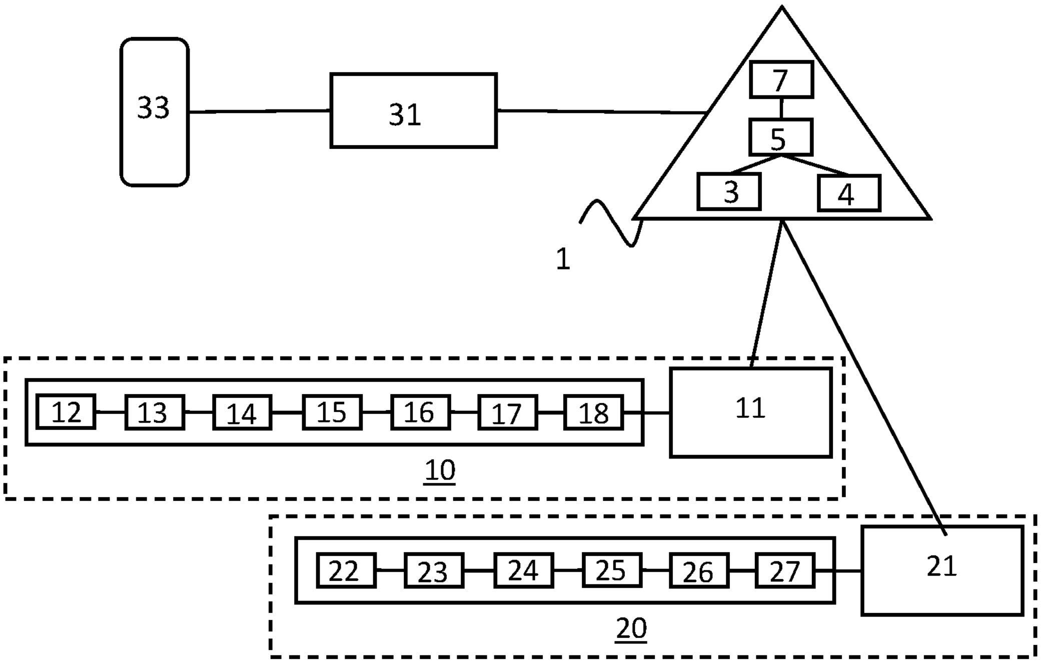
FIG. 1 is a block diagram of a first embodiment of the system.

FIG. 1 shows a first embodiment of the system for controlling a first pixelated lighting device and a second pixelated lighting device based on a dynamic light scene. Each of the first and second pixelated lighting devices comprising a plurality of individually controllable light segments. An initial mapping is determined from the dynamic light scene to the plurality of individually controllable light segments of the first pixelated lighting device.

In this first embodiment, the system is a bridge 1. FIG. 1 depicts two pixelated lighting devices: (pixelated) light strips 10 and 20. Light strips 10 and 20 comprise controllers 11 and 21, respectively. Light strip 10 comprises seven individually controllable light segments 12-18 and light strip 20 comprises six individually controllable light segments 22-27. Each individually controllable light segment comprises one or more light sources, e.g., LED elements.

The bridge 1 and the light strips 10 and 20 can communicate wirelessly, e.g., via Zigbee. The bridge 1 is connected to a wireless LAN access point 31, e.g., via Ethernet or Wi-Fi. A mobile phone 33 is also able to connect to the wireless LAN access point 31, e.g., via Wi-Fi. The mobile phone 33 can be used to control the light strips 10 and 20 via the wireless LAN access point 31 and the bridge 1, e g. to turn the light segments of the light strips on or off or to change their light settings.

The bridge 1 comprises a receiver 3, a transmitter 4, a processor 5, and a memory 7. The processor 5 is configured to control, via the transmitter 4, the first light strip 10 and the second light strip 20 based on the dynamic light scene. The dynamic light scene comprises a plurality of light settings that move across the plurality of individually controllable light segments over time. A user of the mobile device 31 may have recalled the dynamic light scene, for example. The dynamic light scene may be obtained from the mobile device 31 or from memory 7, for example.

The processor 5 is further configured to obtain, via the receiver 3, a position of the first light strip 10 relative to the second light strip 20, determine a spatial offset for the initial mapping based on the position of the first light strip 10 relative to the second light strip 20, determine a spatial direction of the dynamic light scene relative to the first light strip 10 based on the position of the first light strip 10 relative to the second light strip 20, and control, via the transmitter 4, the first light strip 10 to render the dynamic light scene according to an adjusted initial mapping.

The initial mapping is adjusted by offsetting the initial mapping according to the spatial offset and the spatial direction. The processor 5 may be configured to control the second light strip 20 to render the dynamic light scene according to a default mapping of the dynamic light scene to the plurality of individually controllable light segments of the second pixelated lighting device, for example.

The initial mapping and later mappings for the light strip 10 may be determined and adjusted by the bridge 1 or by the light strip 10 itself, for example. In the latter implementation, the processor 5 may be configured to transmit a command to a light strip that includes color palette (e.g., a list of colors), window size (e.g., a number larger than one), spatial direction (e.g., left to right or right to left), mode (e.g., normal or symmetrical), transition speed, and spatial offset, for example. If the mode is symmetrical, the spatial direction indicates whether the light effect moves toward or away from the center of the light strip.

All colors of the color palette may be specified in the command or only a subset of the colors in the color palette may be specified in the command. As an example of the latter, three to five colors of a color gradient may be specified and other colors in the color palette may be interpolated from these three to five colors. The window size may indicate how many colors should be shown simultaneously. The window size is smaller than the number of colors in the color palette. Color settings are used in the above example, but other light settings, e.g., brightness, may additionally or alternatively be used.

As described above, the processor 5 is configured to determine the spatial direction and spatial offset for the light strip 10 based on the based on the position of the first light strip 10 relative to the second light strip 20.

Typically, the bridge 1 holds the location and orientation of the lighting devices relative to each other in the room and when an accessory or application recalls a light scene, the bridge 1 knows which lighting devices participate in this light scene. When a scene is recalled, instead of using the defaults, the bridge 1 may decide to modify the spatial offset and/or spatial direction of the light scene based on the relative position(s). For example, if two pixelated lighting devices are close to each other and the bridge 1 knows which corners are closest based on the locations and orientations, the bridge 1 may modify the spatial offset and/or spatial direction for at least one of the pixelated lighting devices to make the renderings of the dynamic light scenes match.

The processor 5 may be configured to obtain the position of the first light strip relative to the second light strip 20 from a signal indicative of user input (e.g., entered on mobile device 33), from one or more camera images (e.g., captured with mobile device 33) or from received information which has been determined from one or more camera images, and/or from one or more signals received from the light strips 10 and 20, for example. As an example of the latter, the processor 5 may be configured to receive signals indicative of the orientations of the light strips 10 and 20 from the light strips 10 and 20 and determine further position information from the received signal strength of the received signals by using triangulation. Light strips 10 and 20 may report received signal strengths of signals received from each other as well. Additionally or alternatively, other RF beacons may be used, for example.

In the embodiment of the bridge 1 shown in FIG. 1, the bridge 1 comprises one processor 5. In an alternative embodiment, the bridge 1 comprises multiple processors. The processor 5 of the bridge 1 may be a general-purpose processor, e.g., ARM-based, or an application-specific processor. The processor 5 of the bridge 1 may run a Unix-based operating system for example. The memory 7 may comprise one or more memory units. The memory 7 may comprise solid-state memory, for example. The memory 7 may be used to store a table of connected lights, for example.

The receiver 3 and the transmitter 4 may use one or more wired or wireless communication technologies, e.g., Ethernet for communicating with the wireless LAN access point 31 and Zigbee for communicating with the light strips 10 and 20, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The bridge 1 may comprise other components typical for a network device such as a power connector. The invention may be implemented using a computer program running on one or more processors.

Figure 2:
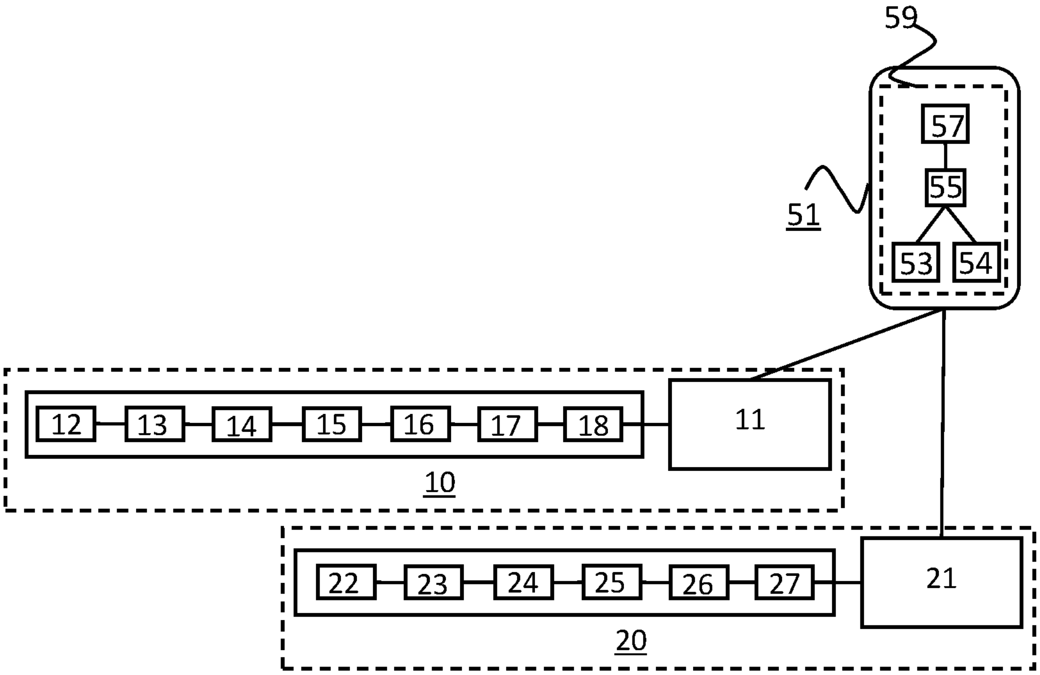
FIG. 2 is a block diagram of a second embodiment of the system.

FIG. 2 shows a second embodiment of the system for controlling a first pixelated lighting device and a second pixelated lighting device based on a dynamic light scene. Each of the first and second pixelated lighting devices comprising a plurality of individually controllable light segments. An initial mapping is determined from the dynamic light scene to the plurality of individually controllable light segments of the first pixelated lighting device.

In this second embodiment, the system is a mobile device 51. FIG. 2 depicts the same two pixelated lighting devices as FIG. 1: light strips 10 and 20. However, in the embodiment of FIG. 2, the mobile device 51 controls the light strips 10 and 20 directly, e.g., using Bluetooth.

The light strips 10 and 20 depicted in FIGS. 1 and 2 can be controlled either via a bridge (see FIG. 1), e.g., using Zigbee, or directly by a mobile device (see FIG. 2), e.g., using Bluetooth. In an alternative embodiment, a pixelated lighting device can only be controlled via a bridge, can only be controlled directly by a mobile device, or can be controlled by a cloud computer. Like the mobile device 33 of FIG. 1, the mobile device 51 of FIG. 2 can be used to control the light strips 10 and 20, e g. to turn the light segments of the light strips on or off or to change their light settings.

The mobile device 51 comprises a transceiver 53, a transmitter 54, a processor 55, memory 57, and a touchscreen display 59. The processor 55 is configured to control, via the transmitter 54, the first light strip 10 and the second light strip 20 based on the dynamic light scene. The dynamic light scene comprises a plurality of light settings that move across the plurality of individually controllable light segments over time.

The processor 55 is further configured to obtain, via the receiver 53, a position of the first light strip 10 relative to the second light strip 20, determine a spatial offset for the initial mapping based on the position of the first light strip 10 relative to the second light strip 20, determine a spatial direction of the dynamic light scene relative to the first light strip 10 based on the position of the first light strip 10 relative to the second light strip 20, and control, via the transmitter 4, the first light strip 10 to render the dynamic light scene according to an adjusted initial mapping. The initial mapping is adjusted by offsetting the initial mapping according to the spatial offset and the spatial direction.

In the embodiment of the mobile device 51 shown in FIG. 2, the mobile device 51 comprises one processor 55. In an alternative embodiment, the mobile device 1 comprises multiple processors. The processor 55 of the mobile device 1 may be a general-purpose processor, e.g., from ARM or Qualcomm or an application-specific processor. The processor 55 of the mobile device 51 may run an Android or iOS operating system for example. The display 59 may comprise an LCD or OLED display panel, for example. The memory 57 may comprise one or more memory units. The memory 57 may comprise solid state memory, for example.

The receiver 53 and the transmitter 54 may use one or more wireless communication technologies, e.g., Bluetooth, for communicating with the light strips 10 and 20. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 53 and the transmitter 54 are combined into a transceiver. The mobile device 51 may comprise other components typical for a mobile device such as a battery and a power connector. The invention may be implemented using a computer program running on one or more processors.

In the embodiments of FIGS. 1 and 2, the system of the invention comprises a bridge or a mobile device. In an alternative embodiment, the system of the invention is a different device, e.g., a cloud computer. In the embodiments of FIGS. 1 and 2, the system of the invention comprises a single device. In an alternative embodiment, the system of the invention comprises a plurality of devices.

Figure 3:
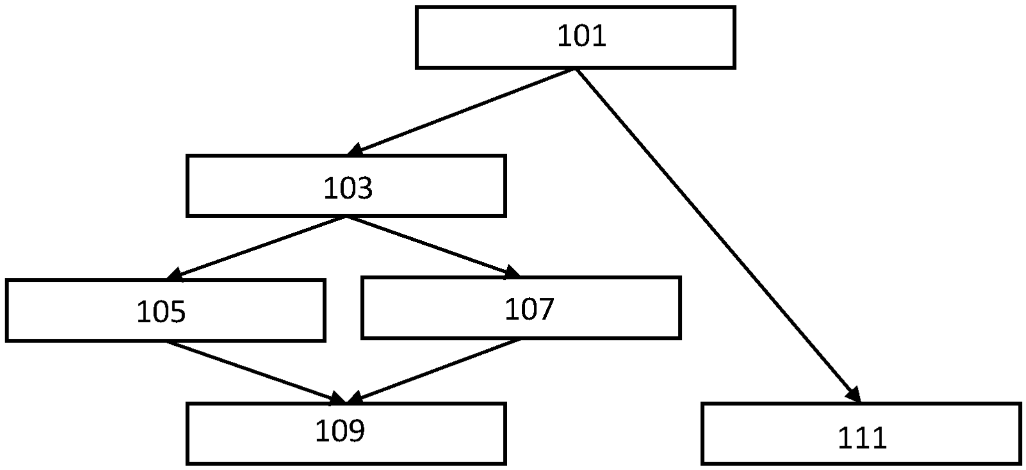
FIG. 3 is a flow diagram of a first embodiment of the method.

A first embodiment of the method of controlling a first pixelated lighting device and a second pixelated lighting device based on a dynamic light scene is shown in FIG. 3. Each of the first and second pixelated lighting devices comprises a plurality of individually controllable light segments. An initial mapping has been determined from the dynamic light scene to the plurality of individually controllable light segments of the first pixelated lighting device. The method may be performed by the bridge 1 of FIG. 1 or the mobile device 51 of FIG. 2, for example.

Figure 5:
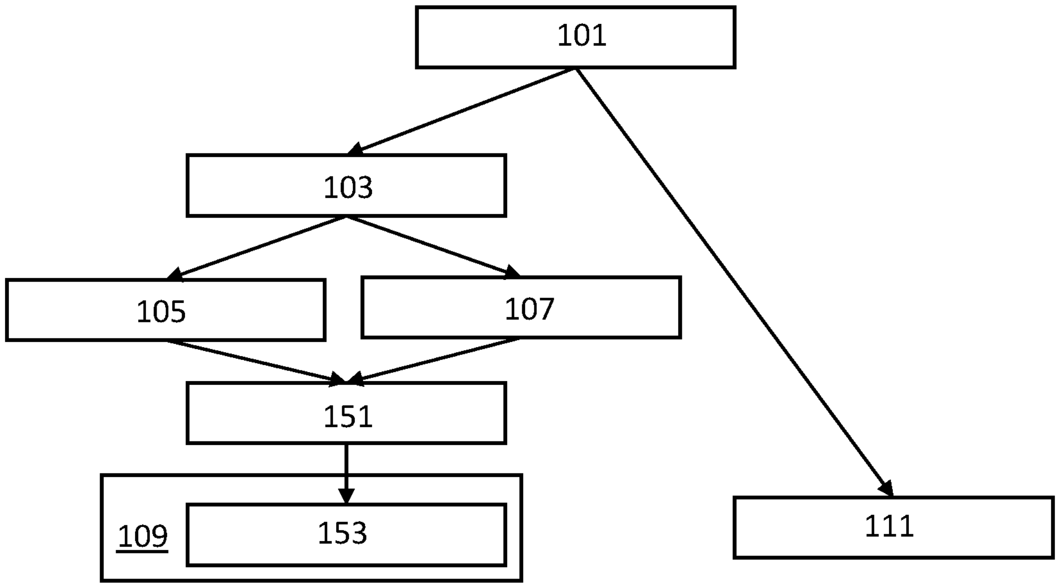
FIG. 5 is a flow diagram of a third embodiment of the method.

A step 101 comprising obtaining a dynamic light scene. The dynamic light scene comprises a plurality of light settings that move across the plurality of individually controllable light segments over time. Next, a step 103 comprises obtaining a position of the first pixelated lighting device relative to the second pixelated lighting device. In the embodiment of FIG. 5, step 101 is performed before step 103. In an alternative embodiment, step 101 is performed after step 103.

Steps 105 and 107 are performed after step 103. Step 105 comprises determining a spatial offset for the initial mapping based on the position of the first pixelated lighting device relative to second pixelated lighting device, as obtained in step 103. Step 107 comprises determining a spatial direction of the dynamic light scene relative to the first pixelated lighting device based on the position of the first pixelated lighting device relative to the second pixelated lighting device, as obtained in step 103.

Next, a step 109 comprises controlling the first pixelated lighting device to render the dynamic light scene obtained in step 101 according to an adjusted initial mapping. The initial mapping is adjusted by offsetting the initial mapping according to the spatial offset and the spatial direction, as determined in steps 105 and 107. A step 111 is also performed after step 101. Step 111 comprises controlling the second pixelated lighting device based on the dynamic light scene obtained in step 101.

Figure 4:
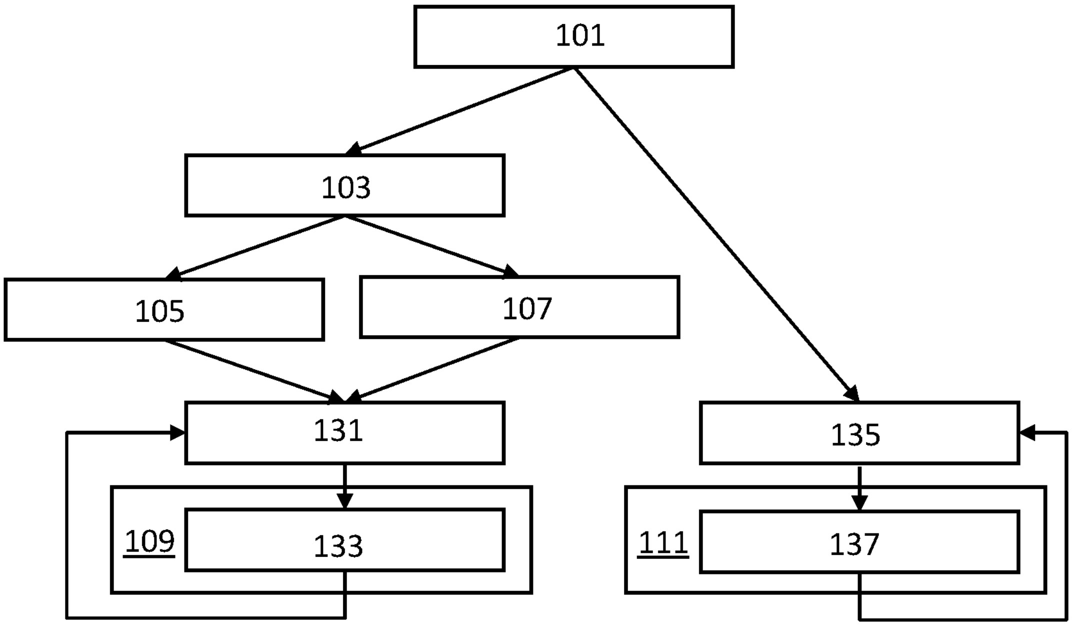
FIG. 4 is a flow diagram of a second embodiment of the method.

A second embodiment of the method of controlling a first pixelated lighting device and a second pixelated lighting device based on a dynamic light scene is shown in FIG. 4. The second embodiment of FIG. 4 is an extension of the first embodiment of FIG. 3. In the embodiment of FIG. 4, mappings are determined by the system which controls the pixelated lighting devices. In an alternative embodiment, mappings are determined by the pixelated lighting devices themselves, based on information transmitted by the system which controls the pixelated lighting devices.

In the embodiment of FIG. 4, step 109 is implemented by a step 133 and preceded by a step 131. Furthermore, step 111 is implemented by a step 137 and preceded by a step 135. In steps 131 and 135, mappings are determined for the first pixelated lighting device and the second pixelated lighting device, respectively. In the first iteration of step 131, an initial first mapping is determined from the dynamic light scene to the plurality of individually controllable light segments of the first pixelated lighting device and then an adjusted first mapping is obtained by offsetting the initial mapping according to the spatial offset and the spatial direction.

Further (successive) mappings from the dynamic light scene to the pluralities of individually controllable light segments are determined in a similar manner in step 131. The further (successive) mappings are determined based on the initial mapping, the spatial offset, and the spatial direction. In step 135, mappings may be determined for the second pixelated lighting device in a conventional manner, for example.

In step 133, the first pixelated lighting device is controlled to render the dynamic light scene according to adjusted mappings determined in step 131. In step 137, the second pixelated lighting device is controlled to render the dynamic light scene according to mappings determined in step 135. In the embodiment of FIG. 4, information specifying the mappings is transmitted to the first pixelated lighting device and the second pixelated lighting device in steps 133 and 137, respectively.

In the alternative embodiment mentioned above, information specifying the spatial offset and the spatial direction is transmitted to the first pixelated lighting device and the first pixelated lighting device is controlled to determine adjusted mappings by offsetting an initial mapping according to the spatial offset and the spatial direction before rendering the dynamic light scene according to the adjusted mappings. The second pixelated lighting device may be controlled with the same format of control commands but may not need to determine adjusted mappings.

A third embodiment of the method of controlling a first pixelated lighting device and a second pixelated lighting device based on a dynamic light scene is shown in FIG. 5. The third embodiment of FIG. 5 is an extension of the first embodiment of FIG. 3. In the embodiment of FIG. 5, step 109 is implemented by a step 153 and a step 151 precedes step 153. Step 151 comprises determining a transition speed.

Optionally, the method comprises an additional step of determining an angle between the first and second pixelated lighting devices based on the position of the first pixelated lighting device relative to the second pixelated lighting device and the transition speed is determined based on this angle in step 151. Optionally, the method comprises an additional step of determining a length of the first pixelated lighting device and the transition speed is determined based on this length in step 151. The transition speed may be determined based on both this angle and this length, for example.

Step 153 comprises controlling the first pixelated lighting device to render the dynamic light scene according to a plurality of successive mappings. A usage duration of each of the successive mappings depends on the transition speed determined in step 151. When the embodiment of FIG. 5 is combined with the embodiment of FIG. 4, the usage duration(s) may be determined in step 131 of FIG. 4, for example, and transmitted to the first pixelated lighting device in step 133 of FIG. 4. Alternatively, the transition speed may be transmitted to the first pixelated lighting device and the first pixelated lighting device may determine the usage duration(s) itself.

Figure 6:
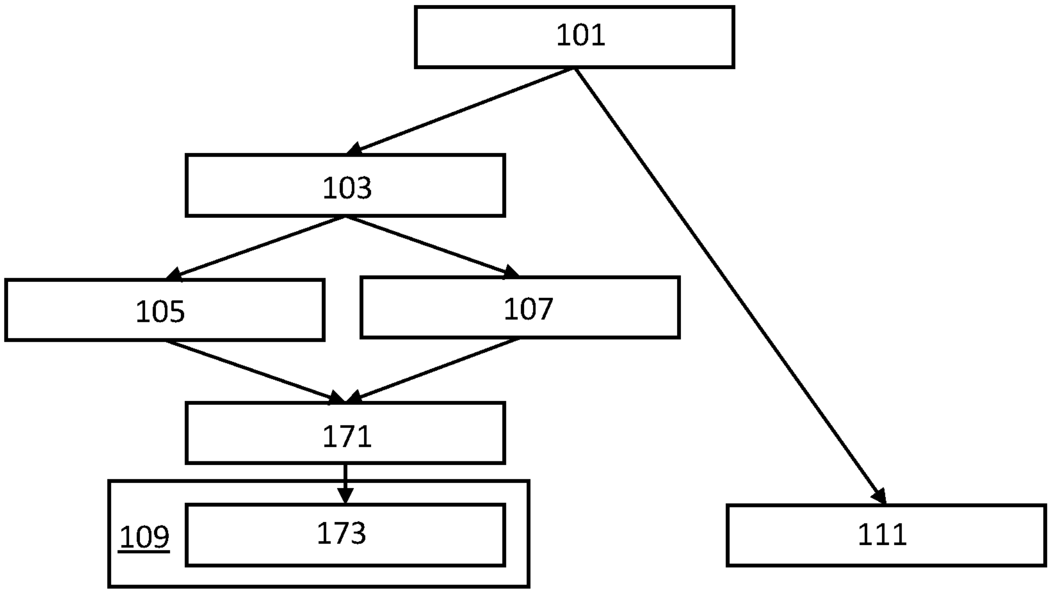
FIG. 6 is a flow diagram of a fourth embodiment of the method.

A fourth embodiment of the method of controlling a first pixelated lighting device and a second pixelated lighting device based on a dynamic light scene is shown in FIG. 6. The fourth embodiment of FIG. 6 is an extension of the first embodiment of FIG. 3. In the embodiment of FIG. 6, step 109 is implemented by a step 173 and a step 171 precedes step 173. Step 171 comprises determining a color and/or light intensity range within the dynamic light scene.

Optionally, the method comprises an additional step of determining an angle between the first and second pixelated lighting devices based on the position of the first pixelated lighting device relative to the second pixelated lighting device and the color and/or light intensity range is determined based on this angle in step 151. Optionally, the method comprises an additional step of determining a length of the first pixelated lighting device and the color and/or light intensity range is determined based on this length in step 151. The color and/or light intensity range may be determined based on both this angle and this length, for example.

Step 173 comprises controlling the first pixelated lighting device to render the dynamic light scene according to an adjusted initial mapping. The initial mapping is adjusted by offsetting the initial mapping according to the spatial offset and the spatial direction and further adjusted to conform to the color and/or light intensity range determined in step 171.

Figure 7:
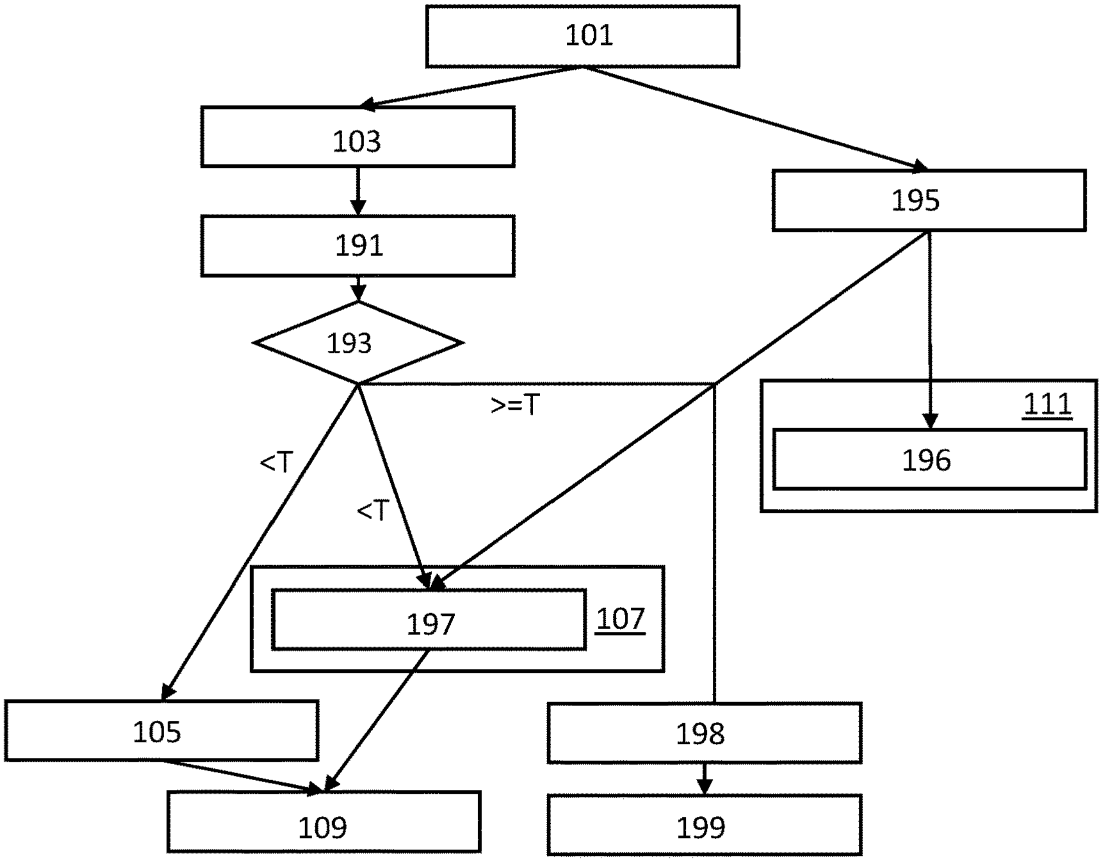
FIG. 7 is a flow diagram of a fifth embodiment of the method.

A fifth embodiment of the method of controlling a first pixelated lighting device and a second pixelated lighting device based on a dynamic light scene is shown in FIG. 7. The fifth embodiment of FIG. 7 is an extension of the first embodiment of FIG. 3. Step 101 comprising obtaining a dynamic light scene. The dynamic light scene comprises a plurality of light settings that move across the plurality of individually controllable light segments over time.

A step 195 is performed after step 101. Step 195 comprises determining a spatial direction of the dynamic light scene relative to the second pixelated lighting device. This spatial direction may be a user-configurable setting, for example. Next, a step 196 comprises controlling the second pixelated lighting device based on the dynamic light scene. If necessary, the initial mapping for the second pixelated lighting device is adjusted by offsetting the initial mapping according to the spatial direction determined in step 195.

Step 103 is also performed after step 101. Step 103 comprises obtaining a position of the first pixelated lighting device relative to the second pixelated lighting device. In the embodiment of FIG. 7, the position obtained in step 103 is indicative of a relative distance between the first and second pixelated lighting devices and this relative distance is determined in a step 191.

A step 193 comprises determining whether the relative distance between the first and second pixelated lighting devices, as determined in step 191, exceeds a threshold. This threshold may be user configurable. Steps 105 and 107 are performed if it is determined in step 193 that the relative distance between the first and second pixelated lighting devices does not exceed the threshold. Otherwise, a step 198 is performed.

Step 105 comprises determining a spatial offset for the initial mapping based on the position of the first pixelated lighting device relative to second pixelated lighting device, as obtained in step 103. Step 107 is implemented by a step 197. Step 197 comprises determining a spatial direction of the dynamic light scene relative to the first pixelated lighting device based on the position of the first pixelated lighting device relative to the second pixelated lighting device, as obtained in step 103, and further based on the spatial direction of the dynamic light scene relative to the second pixelated lighting device, as determined in step 195.

Step 109 comprises controlling the first pixelated lighting device to render the dynamic light scene according to an adjusted initial mapping. The initial mapping is adjusted by offsetting the initial mapping according to the spatial offset determined in step 105 and the spatial direction determined in step 197.

Step 198 comprises determining a spatial direction of the dynamic light scene relative to the first pixelated lighting device in a different manner, e.g., in a conventional manner. This spatial direction may be a user-configurable setting, for example. Next, a step 199 comprises controlling the first pixelated lighting device based on the dynamic light scene. If necessary, the initial mapping for the first pixelated lighting device is adjusted by offsetting the initial mapping according to the spatial direction determined in step 198.

Figure 8:
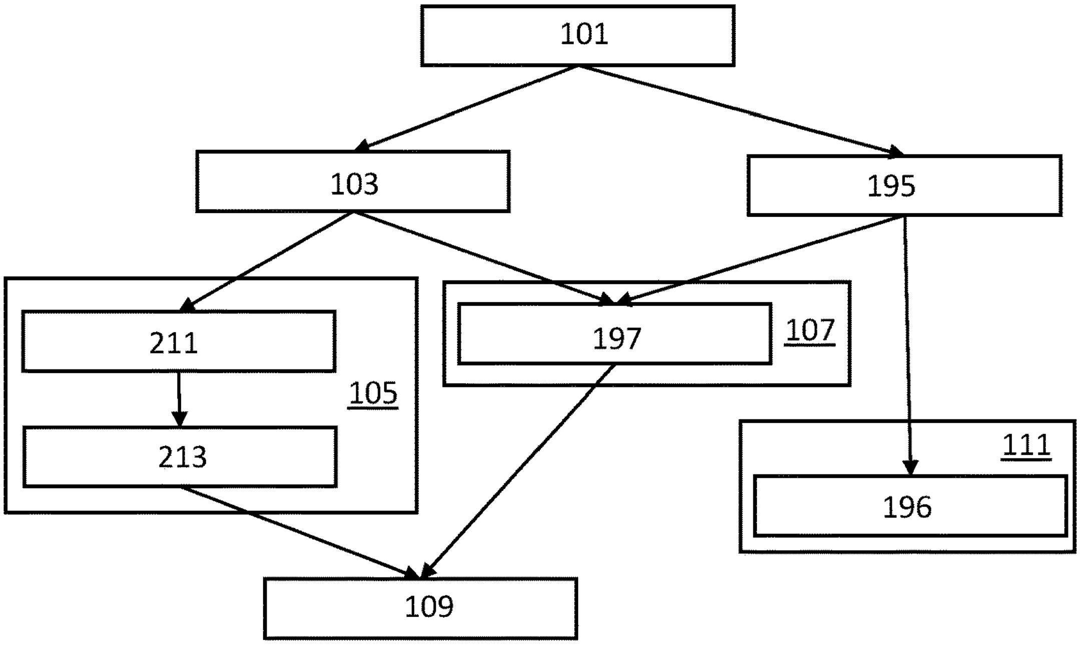
FIG. 8 is a flow diagram of a sixth embodiment of the method.

A sixth embodiment of the method of controlling a first pixelated lighting device and a second pixelated lighting device based on a dynamic light scene is shown in FIG. 8. The sixth embodiment of FIG. 8 is an extension of the first embodiment of FIG. 3. Step 101 comprising obtaining a dynamic light scene. The dynamic light scene comprises a plurality of light settings that move across the plurality of individually controllable light segments over time.

Step 195 is performed after step 101. Step 195 comprises determining a spatial direction of the dynamic light scene relative to the second pixelated lighting device. This spatial direction may be a user-configurable setting, for example. Next, step 196 comprises controlling the second pixelated lighting device based on the dynamic light scene. If necessary, the initial mapping for the second pixelated lighting device is adjusted by offsetting the initial mapping according to the spatial direction determined in step 195.

Step 103 is also performed after step 101. Step 103 comprises obtaining a position of the first pixelated lighting device relative to the second pixelated lighting device. Steps 105 and 107 are performed after step 103.

Step 105 is implemented by steps 211 and 213. Step 211 comprises selecting a light segment from the plurality of individually controllable light segments of the first pixelated lighting device based on the position obtained in step 103. Specifically, the light segment closest to the second pixelated lighting device is selected in step 211. A step 213 is performed after step 211. Step 213 comprises determining the spatial offset based on the light segment selected in step 211.

Step 107 is implemented by step 197. Step 197 comprises determining a spatial direction of the dynamic light scene relative to the first pixelated lighting device based on the position of the first pixelated lighting device relative to the second pixelated lighting device, as obtained in step 103, and further based on the spatial direction of the dynamic light scene relative to the second pixelated lighting device, as determined in step 195.

Step 109 comprises controlling the first pixelated lighting device to render the dynamic light scene according to an adjusted initial mapping. The initial mapping is adjusted by offsetting the initial mapping according to the spatial offset determined in step 105 and the spatial direction determined in step 197.

Figure 9:
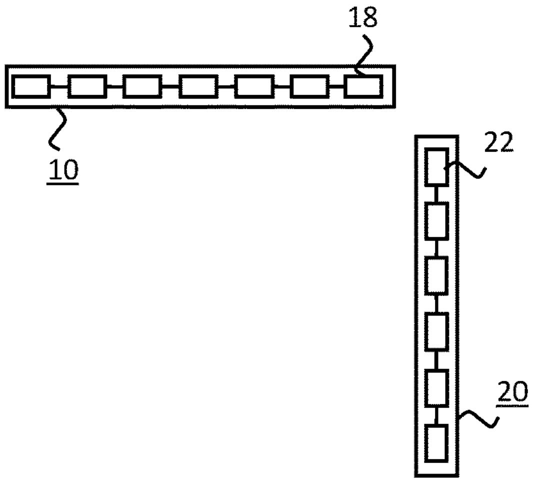
FIG. 9-13 show examples of arrangements of the pixelated lightings devices of FIGS. 1 and 2.

FIGS. 9-13 show examples of arrangements of the pixelated lightings devices of FIGS. 1 and 2. In the example of FIG. 9, the end of (pixelated) light strip 10 is close to the beginning of (pixelated) light strip 20. In this case, the spatial offset and spatial direction of light strip 10 are determined such that the light setting(s) of light segment 18 match with the light setting(s) of light segment 22. This way, if the light strips are close enough, the light strip 20 seems like an extension of light strip 10. For example, the same color gradient may be rendered on light strip 10 starting at light segment 18 and on light strip 20 starting at light segment 22 or a first part of the color gradient may be rendered on light strip 10 and a second part of the color gradient may be rendered on light strip 20.

Figure 10:
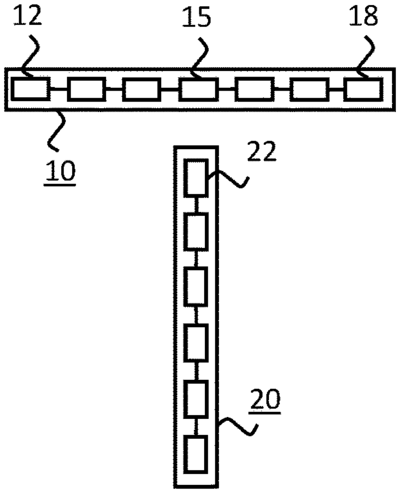

In the example of FIG. 10, the center of (pixelated) light strip 10 is close to the beginning of (pixelated) light strip 20. In this case, the spatial offset and spatial direction of light strip 10 are determined such that the light setting(s) of light segment 15 match with the light setting(s) of light segment 22. The light strip 10 may then be controlled to render the dynamic light scene in a symmetrical mode instead of in a normal mode. For example, the same color gradient may be rendered on light strip 10 starting at light segment 15 and ending at light segment 12, on light strip 10 starting at light segment 15 and ending at light segment 18, and on light strip 20 (in normal mode) starting at light segment 22. Although the three color gradients all start at color X and all end and at color Y, the color gradient rendered on light strip 20 contains more colors that the color gradients rendered on light strip 10.

In the examples of FIGS. 9 and 10, the same color gradients are rendered on both light strips 10 and 20. Alternatively, a different color gradient may be rendered on the light strip 10 than on the light strip 20. In other words, each light strip renders a part of the original color gradient and these parts are not the same. For example, the window size of one or both of the light strips may be adjusted. This may not only be performed for color gradients but also for intensity gradients. As a result, the color and/or light intensity ranges of the light strips are different. This has been described previously in relation to FIG. 6.

Figure 11:
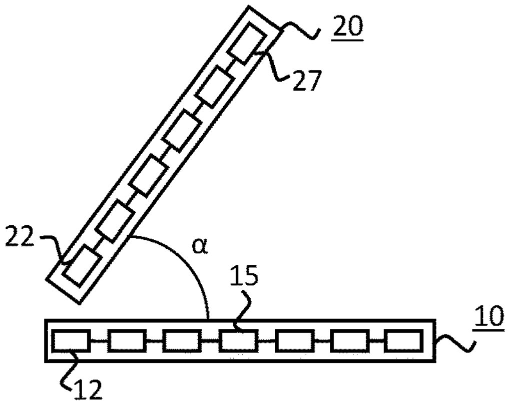

The color and/or light intensity ranges may be determined based on the angle between light strips 10 and 20 and/or based on the lengths of the light strips, for example. In the example of FIG. 11, the color and/or light intensity range of the light strip 10 and/or the light strip 20 are determined based on angle α such that light segments 12 and 22 render the same color (e.g., color X) at the same time and light segments 15 and 27 render the same color (e.g., color Y) at the same time.

As described in relation to FIG. 7, the spatial offset and/or spatial direction may be determined based on the position of the first pixelated lighting device relative to the second pixelated lighting device in dependence on the distance between the first and second pixelated lighting devices. For example, the spatial directions of the two pixelated lighting devices may be matched under the condition that the distance d between the two pixelated lighting devices does not exceed a threshold T.

Figure 12:
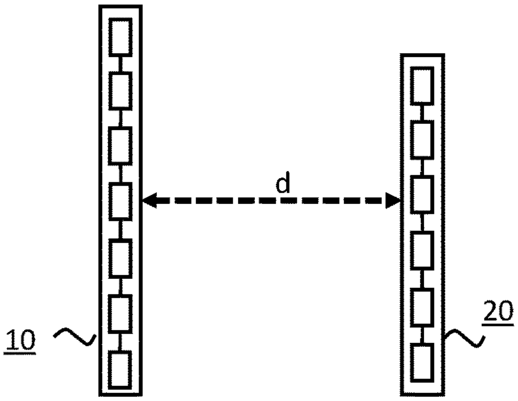
Figure 13:
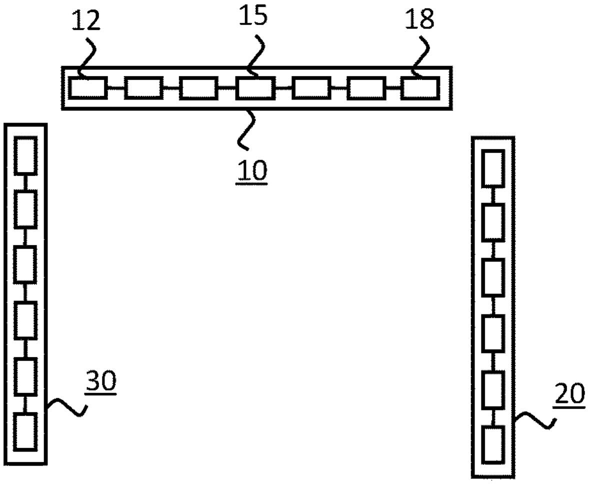

An example of a distance d between light strips 10 and 20 is shown in FIG. 12. If the light strip 10 and/or light strip 20 is moved between recalls of the dynamic light scene, the rendering of the dynamic light scene may change accordingly. For example, if the distance d exceeds threshold T (e.g., if the light strips are on opposite sides of the room), each light strip may render the light settings according to its default spatial offset and default spatial direction, e.g., in opposite directions. The next time, the distance d might not exceed threshold T and the spatial offsets and spatial directions of light strips 10 and 20 are then matched e.g., such that the light settings move up from the bottom of the light strips on both light strips. Alternatively, spatial offsets and spatial directions of light strips 10 and 20 may be matched by continuing the movement of light settings on the second light strip, i.e., by treating the two light strips as an extended light strip.

The examples of FIGS. 9-12 all show two pixelated lighting devices. Spatial offset and spatial direction may also be matched when there are more than two pixelated lighting devices. If all pixelated lighting devices are positioned parallel to each other, then this may be realized in a relatively simple manner. For example, the light settings may move up from the bottom of the light strips on all light strips. Since limiting the use to a parallel arrangement of pixelated lighting devices is not always desirable, the pixelated lighting devices may implement a mode in which light settings move in two directions simultaneously or may be controlled in such a manner.

For example, it may be possible to let the pixelated lighting devices render the dynamic light scene in a symmetrical mode. This is illustrated with the help of FIG. 13. If the light settings move up from the bottom of light strips 20 and 30, the light settings may then move from light segment 12 to light segment 15 and from light segment 18 to light segment 15 on light strip 10. In a first implementation, this happens when light strip 10 is controlled to render the dynamic light scene in "symmetrical" mode "from left to right". If the light settings move down from the top of light strips 20 and 30, the light settings may first move from light segment 15 to light segment 12 and from light segment 15 to light segment 18 on light strip 10. In the afore-mentioned first implementation, this happens when light strip 10 is controlled to render the dynamic light scene in "symmetrical" mode "from right to left".

In order to match spatial offsets and spatial directions, a graph may be constructed. This graph may be constructed by the bridge 1 of FIG. 1 or the mobile device 51 of FIG. 2, for example. The graph may reflect which nodes should be treated as connected, i.e., which nodes are close together.

The embodiments of FIGS. 3 to 8 differ from each other in multiple aspects, i.e., multiple steps have been added or replaced. In variations on these embodiments, only a subset of these steps is added or replaced and/or one or more steps is omitted. As an example, steps 195-197 may be omitted from the embodiments of FIGS. 7 and/or 8 and/or added to one or more of the embodiments of FIGS. 3 to 6. Furthermore, one or more of the embodiments of FIGS. 4 to 8 may be combined.

Figure 14:
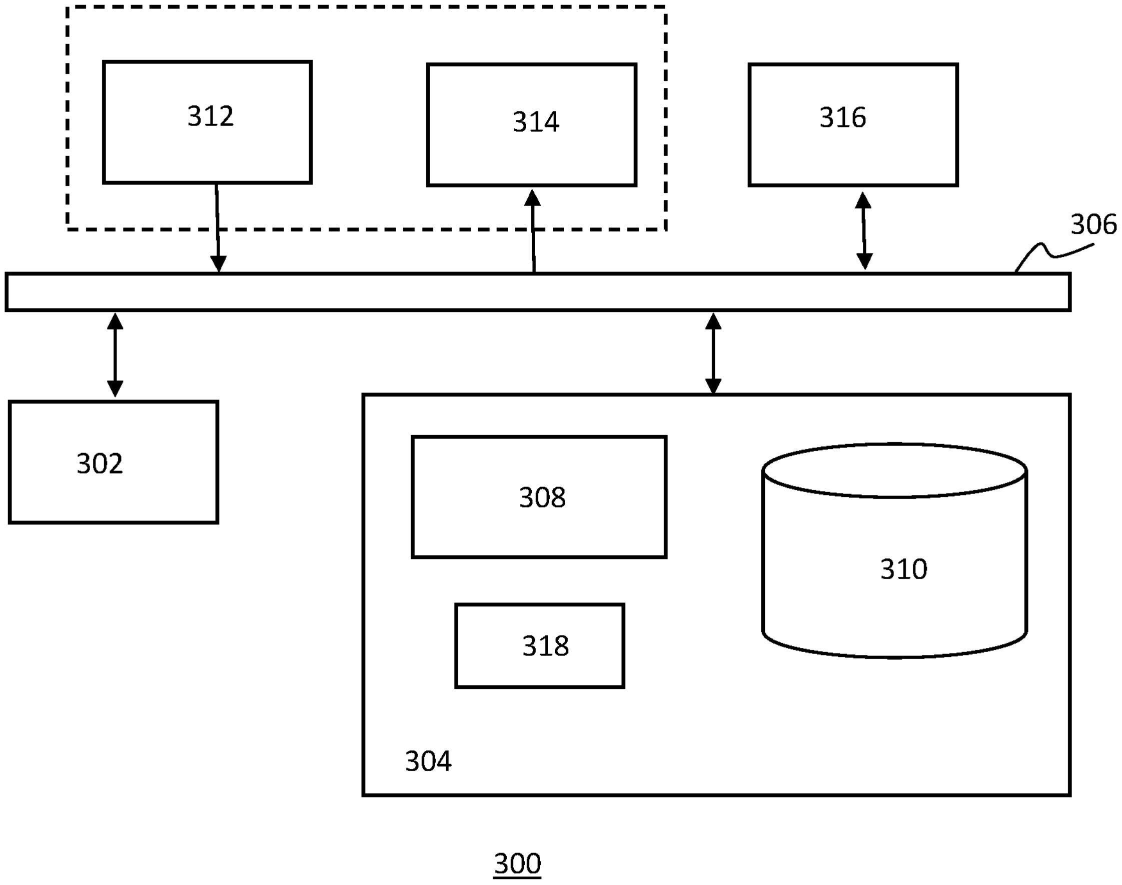
FIG. 14 is a block diagram of an exemplary data processing system for performing the method of the invention.

FIG. 14 depicts a block diagram illustrating an exemplary data processing system that may perform the method as described with reference to FIGS. 3 to 8.

As shown in FIG. 14, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 14 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g., a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 14, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 14) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

FIG. 14 shows the input device 312 and the output device 314 as being separate from the network adapter 316. However, additionally or alternatively, input may be received via the network adapter 316 and output be transmitted via the network adapter 316. For example, the data processing system 300 may be a cloud server. In this case, the input may be received from and the output may be transmitted to a user device that acts as a terminal.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for controlling a first pixelated lighting device and a second pixelated lighting device based on a dynamic light scene, each of the first and second pixelated lighting devices having a plurality of individually controllable light segments, wherein an initial mapping has been determined from the dynamic light scene to the plurality of individually controllable light segments of the first pixelated lighting device, the system comprising:

at least one input interface;

at least one transmitter; and at least one processor configured to:

control, via the at least one transmitter, the first pixelated lighting device and the second pixelated lighting device based on the dynamic light scene, the dynamic light scene having a plurality of light settings that move across the plurality of individually controllable light segments over time, obtain, via the at least one input interface, a position of the first pixelated lighting device relative to the second pixelated lighting device, determine a spatial offset for the initial mapping based on the position of the first pixelated lighting device relative to second pixelated lighting device, determine a spatial direction of the dynamic light scene relative to the first pixelated lighting device based on the position of the first pixelated lighting device relative to the second pixelated lighting device, determine a transition speed of the first pixelated lighting device, and control, via the at least one transmitter, the first pixelated lighting device to render the dynamic light scene (i) according to an adjusted initial mapping, the initial mapping being adjusted by offsetting the initial mapping according to the spatial offset and the spatial direction, and (ii) according to a plurality of successive mappings, a usage duration of each of the successive mappings depending on the transition speed and the plurality of successive mappings including the adjusted initial mapping.

2. The system as claimed in claim 1, wherein the at least one processor is configured to determine an angle between the first and second pixelated lighting devices based on the position of the first pixelated lighting device relative to the second pixelated lighting device and determine the transition speed based on the angle.

3. The system as claimed in claim 1, wherein the at least one processor is configured to determine a length of the first pixelated lighting device and determine the transition speed based on the length.

4. The system as claimed in claim 1, wherein the at least one processor is configured to determine a color and/or light intensity range within the dynamic light scene and the initial mapping is further adjusted to conform to the color and/or light intensity range.

5. The system as claimed in claim 4, wherein the at least one processor is configured to determine an angle between the first and second pixelated lighting devices based on the position of the first pixelated lighting device relative to the second pixelated lighting device and determine the color and/or light intensity range based on the angle.

6. The system as claimed in claim 4, wherein the at least one processor is configured to determine a length of the first pixelated lighting device and determine the range based on the length.

7. The system as claimed in claim 1, wherein the at least one processor is further configured to determine the spatial direction of the dynamic light scene relative to the first pixelated lighting device further based on a spatial direction of the dynamic light scene relative to the second pixelated lighting device as used by the second pixelated lighting device.

8. The system as claimed in claim 1, wherein the position of the first pixelated lighting device relative to the second pixelated lighting device is indicative of a relative distance between the first and second pixelated lighting devices, and the at least one processor is further configured to:

determine whether the relative distance between the first and second pixelated lighting devices exceeds a threshold, and determine the spatial offset and the spatial direction based on the position of the first pixelated lighting device relative to second pixelated lighting device if it is determined that the relative distance between the first and second pixelated lighting devices does not exceed the threshold.

9. The system as claimed in claim 8, wherein the at least one processor is configured to allow a user to adjust the threshold.

10. The system as claimed in claim 1, wherein the at least one processor is configured to select a light segment from the plurality of individually controllable light segments of the first pixelated lighting device, the light segment being closest to the second pixelated lighting device, and determine the spatial offset based on the selected light segment.

11. The system as claimed in claim 1, wherein successive mappings from the dynamic light scene to the pluralities of individually controllable light segments are determined based on the initial mapping, the spatial offset, and the spatial direction.

12. A method of controlling a first pixelated lighting device and a second pixelated lighting device based on a dynamic light scene, each of the first and second pixelated lighting devices having a plurality of individually controllable light segments, wherein an initial mapping has been determined from the dynamic light scene to the plurality of individually controllable light segments of the first pixelated lighting device, the method comprising:

obtaining a position of the first pixelated lighting device relative to the second pixelated lighting device, determining a spatial offset for the initial mapping based on the position of the first pixelated lighting device relative to second pixelated lighting device, determining a spatial direction of the dynamic light scene relative to the first pixelated lighting device based on the position of the first pixelated lighting device relative to the second pixelated lighting device, and determine a transition speed of the first pixelated lighting device, controlling the first pixelated lighting device and the second pixelated lighting device based on the dynamic light scene, the dynamic light scene having a plurality of light settings that move across the plurality of individually controllable light segments over time, the first pixelated lighting device being controlled to render the dynamic light scene according to an adjusted initial mapping, the initial mapping being adjusted by offsetting the initial mapping according to the spatial offset and the spatial direction, and controlling the first pixelated lighting device based on the dynamic light scene according to a plurality of successive mappings, a usage duration of each of the successive mappings depending on the transition speed and the plurality of successive mappings including the adjusted initial mapping.

13. A non-transitory computer readable medium comprising computer program code to perform the method of claim 12 when run on a processor.

* * * * *